Dec. 24, 1957     E. F. BREWER     2,817,406

POWER MOWER GUIDING AND RIDING ATTACHMENT

Filed July 11, 1955     2 Sheets-Sheet 1

INVENTOR.

E. F. Brewer

BY

Lieber & Lieber
ATTORNEYS.

Dec. 24, 1957     E. F. BREWER     2,817,406
POWER MOWER GUIDING AND RIDING ATTACHMENT
Filed July 11, 1955     2 Sheets-Sheet 2

INVENTOR.
E. F. Brewer
BY
Lieber & Lieber
ATTORNEYS

United States Patent Office 2,817,406
Patented Dec. 24, 1957

2,817,406
POWER MOWER GUIDING AND RIDING ATTACHMENT

Ellsworth F. Brewer, Milwaukee, Wis., assignor to E. F. Brewer Company, a corporation of Wisconsin Application July 11, 1955, Serial No. 520,977

1 Claim. (Cl. 180—11)

This invention relates in general to improvements in the art of manipulating portable power actuated units such as mowers, and relates more specifically to improvements in the construction and operation of power driven mower guiding and riding attachments.

The primary object of the present invention is to provide an improved riding and guiding attachment for power driven mowers or the like, which is simple and durable in construction and highly effective in use.

Some of the more important specific objects of the invention are as follows:

To provide an improved manipulating attachment for power propelled mowers, wherein the operator is transported by the mower and the weight of the rider enhances the tractive force of the mower to a maximum.

To provide an improved front riding attachment for internal combustion driven mowers, wherein the mower manipulating rider has unobstructed vision and is not subjected to flying clippings and obnoxious motor fumes.

To provide an improved guiding attachment which is especially applicable to low horse power motor driven mowers, in a manner whereby the available motive power is most effectively utilized to advance the mower.

To provide an improved mower riding attachment which is easily manipulable and cooperable with various types of mowers having laterally spaced driving wheels, to produce a stable combined unit.

To provide an improved inexpensive mower guiding and riding attachment which is adapted to be readily associated with a two-wheeled power mower to provide a tricycle mower assemblage capable of effectively traversing relatively uneven ground contour.

To provide an improved attachment for effectively steering a power mower of the reel type over soft and rough terrain, and which may be applied to the mower and manipulated by a novice.

To provide an extremely light weight but sturdy frame structure for a mower riding and guiding attachment, which may be manufactured and sold at moderate cost.

These and other more specific objects and advantages of the invention will be apparent from the following detailed description.

A clear conception of the features constituting the present improvement, and of the construction and operation of a typical commercial embodiment of the invention, may be had by referring to the drawings accompanying and forming a part of this specification wherein like reference characters designate the same or similar parts in the various views.

While the invention has been shown and described herein as being especially advantageously applicable to an attachment for reel type internal combustion driven mowers having only two driving wheels, it is not the intent to unnecessarily restrict the use of the improved features to such mowers; and it is also contemplated that specific descriptive terms employed herein be given the broadest possible interpretation consistent with the actual disclosure.

Figure 1:
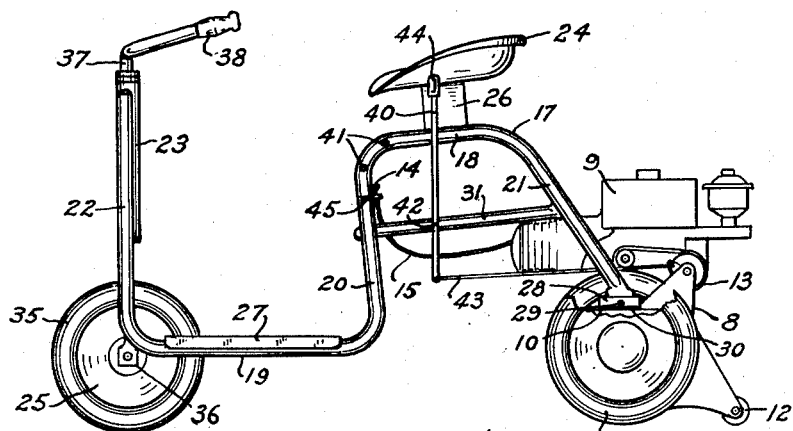
Fig. 1 is a side elevation of one of the improved guiding and riding attachments applied to a typical reel type internal combustion driven mower.
Figure 2:
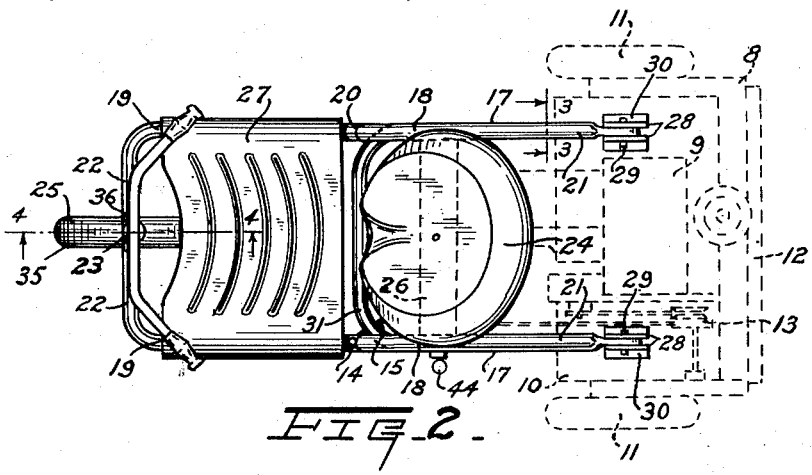
Fig. 2 is a plan view of the assemblage shown in Fig. 1, but showing the mower in dotted lines.

Referring to the drawing, the improved mower guiding and riding attachment shown therein, is especially adapted for convenient application to and cooperation with a reel type power mower 8 in which the reel cooperates with a cutter blade and is revolvable by an internal combustion engine 9 carried by a mounting plate 10 supported upon a pair of coaxial laterally spaced ground engaging drive wheels 11 coacting with a trailing roller 12 for adjusting the height of the cut, see Figs. 1 and 2. The transmission of power from the engine 9 to the reel and wheels 11 is controllable by a clutch 13, and the throttle of the motor is operable by means of a push-button 14 attached to a flexible cable slidably confined within a tubular housing 15, and all of this mower structure is old and well known and constitutes no essential part of the present invention.

As illustrated in the drawings, the present improved riding attachment comprises in general a main frame composed of a pair of rigid opposite side members 17 each provided with approximately horizontal upper rear and lower front medial portions 18, 19 respectively interconnected at their adjacent ends by a downwardly directed connecting section 20, each member 17 having a rear strut section 21 depending from the rear end of its upper horizontal portion 18 and adapted to rest upon the mower plate 10, and each member 17 also having a front inwardly inclined column section 22 rising from the forward end of its lower horizontal portion 19; an upstanding journal sleeve 23 firmly secured to the inwardly inclined front frame sections 22; a seat 24 mounted upon the rear upper frame portions 18; and a front steering wheel 25 journalled in the sleeve 23 and being manipulable by a rider occupying the seat 24, see Figs. 1 and 2.

Figure 3:
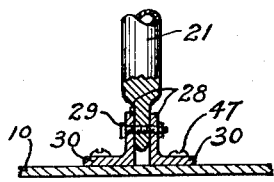
Fig. 3 is enlarged fragmentary section through one of the mounting struts and shoes for the riding attachment, the section having been taken transversely and vertically through the structure along the line 3—3 of Fig. 2.
Figure 4:
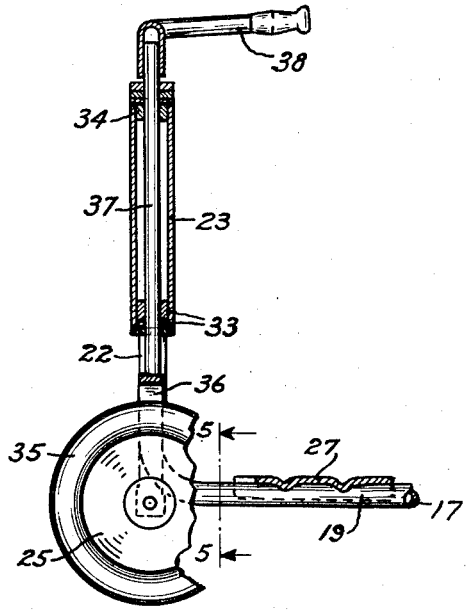
Fig. 4 is a slightly enlarged central vertical section through the front steering mechanism of the mower cycle, the section having been taken along the line 4—4 of Fig. 2.
Figure 5:
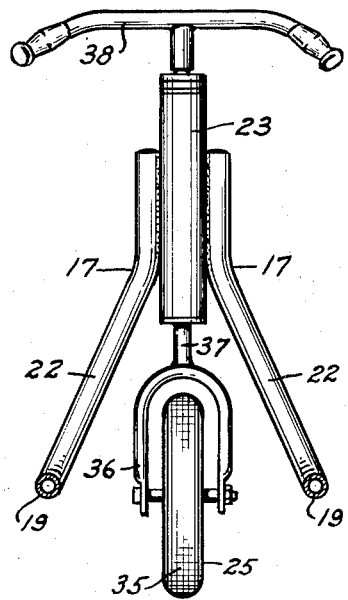
Fig. 5 is a similarly enlarged transverse section through the mower riding attachment, the section having been taken along the line 5—5 of Fig. 4.
Figure 6:
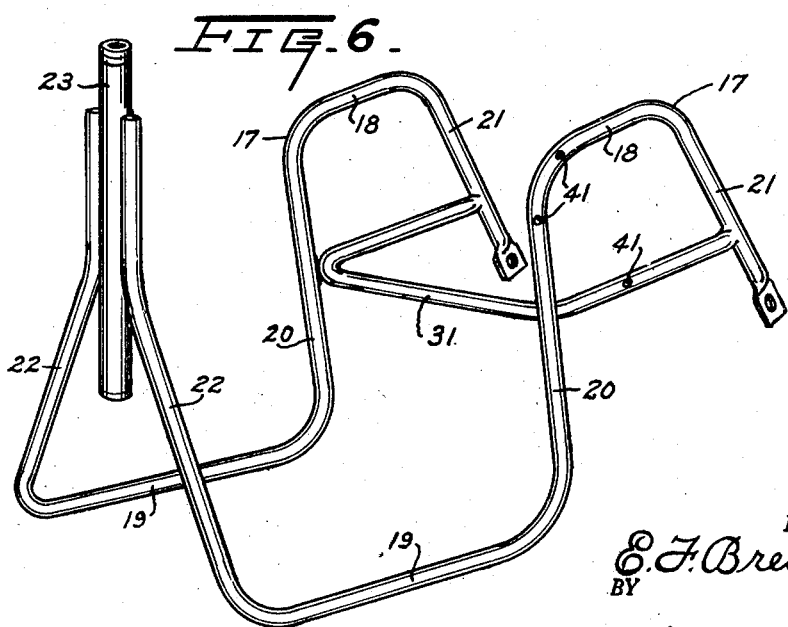
Fig. 6 is a fragmentary front and side perspective view of the frame and steering column sleeve of the mower riding attachment, showing the horizontal U-shaped brace for the frame of the attachment.

Each of the frame members 17 including its portions 18, 19 and its sections 20, 21, 22, is preferably formed of a single continuous piece of light but durable metal tubing, and the upper rear portions 18 of the spaced frame members 17 are firmly interconnected by a bridge plate 26, while the lower front portions 19 of these members 17 are spanned and likewise interconected by a corrugated foot rest 27, as shown in Figs. 1 and 2. The lower extremity of the rear strut section 21 of each frame side member 17, is also preferably provided with a bearing shoe 28 pivotally attached to the lower end of the adjacent section 21 by means of a pivot bolt 29 and provided with flanges 30 adapted to be bolted or otherwise secured to the mower mounting plate 10, as illustrated in Fig. 3; and the connecting sections 20 of the two side frame members 17 and the connecting and strut sections 20, 21 of each member 17, are also rigidly united by an approximately horizontal U-shaped tubular member 31, see Figs. 1 and 6. The bridge plate 26, foot rest 27, and U-shaped member 31, may be welded or otherwise firmly secured to the adjacent members 17 to provide a sturdy frame assemblage readily attachable to a trailing power mower 8 with the aid of the bearing shoes 28.

The inwardly inclined front column sections 22 of the two frame members 17 may also be rigidly attached as by welding, to the journal sleeve 23, and the lower interior of this sleeve 23 is provided with an anti-friction thrust and guide bearing 33 while the upper sleeve portion is provided with a guide bearing 34. The front steering wheel 25 may be provided with a rubber tire 35 and is journalled for rotation in the lower forked end 36 of a steering column 37 the medial portion of which is journalled for oscillation in the bearings 33, 34 of the sleeve 23, and the upper extremity of which has a handle bar 38 secured thereto, as illustrated in Figs. 1, 2, 4 and 5. The rider's seat 24 which is disposed within easy reach of the handle bar 38, may be riveted or otherwise firmly attached to the mid-portion of the bridge plate 26, thus providing a comfortable mount for the cycle occupant.

In order to enable the rider to also control the operation of the power driven mower, while accupying the seat 24, a clutch activating lever 40 may be swingably suspended from one of the side portions of the U-shaped reinforcing member 31 or from openings 41 formed in any other convenient portion of the cycle frame, by means of a pivot 42, and the lower end of this lever 40 may be connected to the clutch 13 by means of a connecting rod 43 while the upper lever end which is disposed closely adjacent to the seat 24 is provided with a manipulating handle 44, as shown in Figs. 1 and 2. The push-button 14 for controlling the throttle of the internal combustion engine 9 of the power mower 8, may also be mounted upon a bracket 45 located upon the frame within easy reach of the rider, thus completing the portable power mower assemblage.

When the improved guiding and riding attachment has been constructed and assembled as above described, it may be readily and quickly attached to an internal combustion engine driven mower 8 by merely removing the steering handle normally supplied with such a mower, and by thereafter firmly attaching the flanges 30 of the rear bearing shoes 28 to the mower mounting plate 10 with the aid of screw bolts 47 as shown in Fig. 3. The lever 40 may be mounted upon the pivot 42 applied to one of the holes 41 and connected to the engine clutch 13 by means of a connecting rod 43 of suitable length, and the throttle control cable housing 15 may be attached to the bracket 45 so as to position the push button 14 within easy reach of the driver's seat 24. The assemblage will then provide a mower cycle mounted upon the three wheels 11, 25 to produce a stable unit adapted to be safely and smoothly transported and guided over relatively uneven ground.

The location of the steering wheel 25 in front of the mower 8 obviously enables the mower operator to plainly see the path of advancement of the unit; and the disposition of the mower manipulator above and in advance of the mower rotor and propelling engine 9 also avoids his or her being subjected to flying grass clippings and to obnoxious exhaust gases from the engine. Then too, the location of the driver's seat 24 near the upper ends of the frame strut sections 21, causes the weight of the rider to assist the weight of the power mower 8 to produce maximum traction at the wheels 11, so that the improved attachment may be most effectively utilized in conjunction with mowers of relatively light weight and limited available horse power.

The improved frame assemblage may be durably constructed of relatively light but strong tubing at very moderate cost, and the relative disposition of the seat 24, foot rest 27 and handle bar 38 provides utmost comfort for the rider. The attachment may be applied to mowers of different types and manipulated to effect short turning and control of the engine by a novice and requires no attention aside from occasional lubrication of the bearings 33, 34 and of the supporting and steering wheel bearings, after having been properly associated with the mower. The improved power driven mower cycles have proven highly satisfactory and successful in actual commercial use, and provide a relatively inexpensive but highly efficient mower unit.

It should be understood that it is not desired to limit this invention to the exact details of construction or to the precise mode of operation, of the power mower riding and guiding attachment, herein specifically shown and described, for various modifications within the scope of the appended claim may occur to persons skilled in the art.

I claim:

In a power mower guiding and riding attachment, a frame having unitary opposite side members each provided with approximately horizontal upper rear and lower front portions interconnected at their adjacent front and rear respective ends by an integral medial upstanding section and having an integral rearwardly and downwardly inclined strut depending from the rear extremity of its said upper portion adapted to rest upon a trailing mower and also having an integral inwardly and upwardly inclined column rising from the front of its said lower portion, a journal sleeve located between and rigidly attached to said frame member columns to provide an unobstructed space above said lower frame portions ahead of said medial frame sections, a horizontal U-shaped brace having spaced prongs rigidly connecting said strut and medial section of each side member and also having an integral transverse portion likewise connecting said prongs and said medial frame sections, a seat mounted upon said upper frame portions above said brace, a front steering wheel journalled in said sleeve, and being manipulable by a rider occupying said seat, and a foot rest rigidly uniting said lower frame portions directly beneath said space.

References Cited in the file of this patent

UNITED STATES PATENTS

| | | |
|---|---|---|
| 1,098,939 | Chrysler | June 2, 1914 |
| 2,192,468 | Gore | Mar. 5, 1940 |
| 2,530,041 | Bennett | Nov. 14, 1950 |
| 2,696,272 | Schlaphoff | Dec. 7, 1954 |

FOREIGN PATENTS

| | | |
|---|---|---|
| 1,020,848 | France | Nov. 26, 1952 |
| 525,148 | Great Britain | Aug. 22, 1940 |